C. L. MARTIN.
HOSE-COUPLING.

No. 178,939. Patented June 20, 1876.

UNITED STATES PATENT OFFICE.

CALVIN L. MARTIN, OF PORTLAND, MAINE.

IMPROVEMENT IN HOSE-COUPLINGS.

Specification forming part of Letters Patent No. 178,939, dated June 20, 1876; application filed April 25, 1876.

*To all whom it may concern:*

Be it known that I, CALVIN L. MARTIN, of Portland, Cumberland county, Maine, have invented a new and Improved Hose-Coupling, of which the following is a specification:

My improved coupling consists of two or more spring-catches on one section to spring over a flange on the other, the said catches having a lever and a cam-rocker, by which to detach them from the flange readily when the hose is to be uncoupled.

The coupling is more especially intended for coupling the hose used in connection with the vacuum car-brakes, which, as heretofore arranged, have to be twisted to pass the rigid catches of one section through the notches of the flange of the other section, which is difficult to do, and injurious to the hose, particularly in cold weather; but it is also applicable to other hose.

Figure 1:
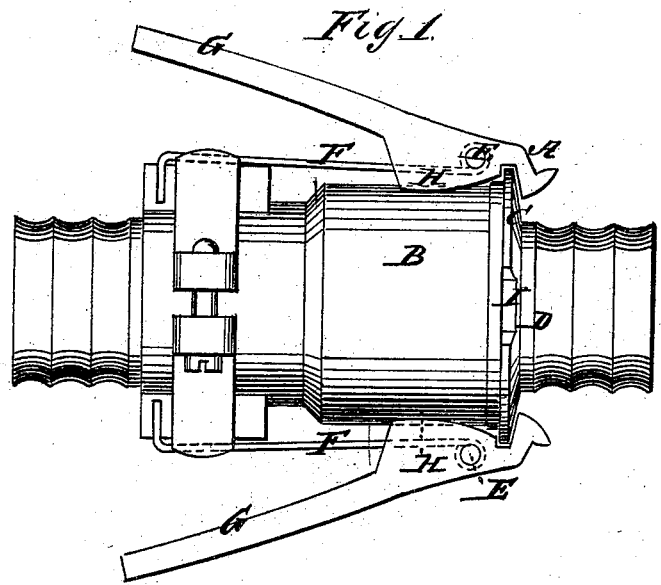
Figure 2:
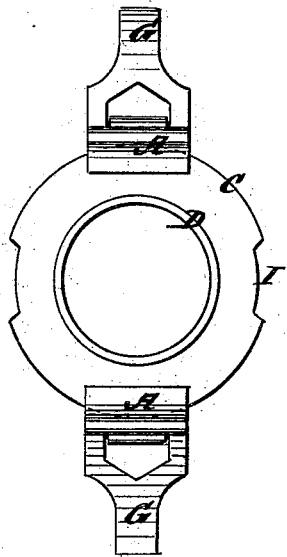

Figure 1 is a side elevation of my improved hose-coupling, and Fig. 2 is an end elevation.

Similar letters of reference indicate corresponding parts.

A represents the catches of section B, for engaging the flange C of sections D. They are pivoted at E to springs F, and have a lever, G, and also a cam-rocker, H, by which to raise them off the flange when the hose is to be uncoupled. I represents the notches of the flange for the ordinary catches to pass through to lock it by turning on the flange after passing through them.

I make my catches wider than those notches, so that in case it may be desirable to apply them to a coupling having a notched flange they cannot disconnect in case the sections work around on each other, as they sometimes do, by which the ordinary couplings disconnect.

Having thus described my invention, I claim as new and desire to secure by Letters Patent—

The catch A, connected to springs, and having a lever, G, and a rocker-fulcrum, H, in combination with the sections B D of a hose-coupling, substantially as specified.

CALVIN LUTHER MARTIN.

Witnesses:
    JOHN TILTON,
    EDWIN P. CAPELL.